United States Patent
Hossain et al.

(10) Patent No.: US 11,037,207 B2
(45) Date of Patent: Jun. 15, 2021

(54) CHANNEL SYNCHRONIZATION ENGINE WITH CALL CONTROL

(71) Applicant: Shopify Inc., Ottawa (CA)

(72) Inventors: Zabrina Hossain, Toronto (CA); Mandip Randhawa, North York (CA); Daniel Ragno, Oakville (CA); Ershad Rahimikia, Toronto (CA); Emily Rucker, Toronto (CA)

(73) Assignee: Shopify Inc., Ottawa (CA)

( * ) Notice: Subject to any disclaimer, the term of this patent is extended or adjusted under 35 U.S.C. 154(b) by 91 days.

(21) Appl. No.: 16/546,183

(22) Filed: Aug. 20, 2019

(65) Prior Publication Data
US 2021/0056595 A1    Feb. 25, 2021

(51) Int. Cl.
*G06Q 30/02*     (2012.01)
*G06F 16/27*     (2019.01)

(52) U.S. Cl.
CPC ......... *G06Q 30/0277* (2013.01); *G06F 16/27* (2019.01)

(58) Field of Classification Search
CPC ..... G06F 16/273; G06F 16/275; G06F 16/278
See application file for complete search history.

(56) References Cited

U.S. PATENT DOCUMENTS

| | | | | |
|---|---|---|---|---|
| 6,247,047 | B1 * | 6/2001 | Wolff | G06Q 30/02 705/14.73 |
| 8,458,054 | B1 | 6/2013 | Thakur | |
| 10,585,877 | B1 * | 3/2020 | Casazza | G06F 16/24 |
| 10,848,560 | B2 * | 11/2020 | Crofton | G06F 16/278 |
| 10,872,366 | B1 * | 12/2020 | Pitzel | G06Q 30/0609 |
| 2002/0161672 | A1 | 10/2002 | Banks et al. | |
| 2003/0023514 | A1 | 1/2003 | Adler et al. | |
| 2004/0167768 | A1 | 8/2004 | Travieso et al. | |
| 2006/0190339 | A1 | 8/2006 | Wan et al. | |
| 2007/0255631 | A1 | 11/2007 | Schmidt et al. | |
| 2007/0282693 | A1 | 12/2007 | Staib et al. | |
| 2008/0027830 | A1 | 1/2008 | Johnson et al. | |

(Continued)

OTHER PUBLICATIONS

U.S. Appl. No. 16/546,174, "U.S. Appl. No. 16/546,174, Non-Final Office Action dated Feb. 22, 2021", Shopify Inc., 30 pages.

(Continued)

*Primary Examiner* — David J Stoltenberg
(74) *Attorney, Agent, or Firm* — Moffat & Co

(57) ABSTRACT

Methods and systems relating to formulating requests to a commerce management engine for product information may include a synchronization engine that estimates, using error data, future synchronization errors of product information to one or more channels. Each channel has respective product data fields for that channel and the error data relates to a prior synchronization of product information from one or more storefronts to the one or more channels and includes identified errors from the prior synchronization and corresponding corrections for resolving at least a subset of the identified errors. The synchronization may formulate a request, wherein the request requests product information for one or more products of the one or more storefronts for a future product synchronization with the one or more channels and includes a request parameter that is based on the estimated future synchronization errors.

24 Claims, 7 Drawing Sheets

(56) References Cited

U.S. PATENT DOCUMENTS

| | | | |
|---|---|---|---|
| 2008/0097847 A1* | 4/2008 | Perkowski | G07F 17/16 |
| | | | 705/14.38 |
| 2008/0126225 A1 | 5/2008 | Briggs et al. | |
| 2009/0037452 A1* | 2/2009 | Baitalmal | G06F 16/27 |
| 2009/0300072 A1* | 12/2009 | Goh | G06F 16/275 |
| 2010/0198641 A1 | 8/2010 | Wilson et al. | |
| 2011/0302063 A1* | 12/2011 | Bey | G06Q 10/20 |
| | | | 705/30 |
| 2013/0006929 A1* | 1/2013 | McCarthy | G06F 16/176 |
| | | | 707/622 |
| 2013/0211964 A1 | 8/2013 | Hampton | |
| 2014/0304220 A1* | 10/2014 | Clendinning | G06Q 10/087 |
| | | | 707/607 |
| 2015/0213099 A1* | 7/2015 | Rinke | G06F 16/27 |
| | | | 707/634 |
| 2016/0098469 A1* | 4/2016 | Allinson | G06F 16/178 |
| | | | 707/610 |
| 2016/0110406 A1* | 4/2016 | Zircher | G06F 16/2365 |
| | | | 707/690 |
| 2016/0142481 A1* | 5/2016 | Castaneda | G06F 16/27 |
| | | | 709/217 |
| 2017/0052652 A1* | 2/2017 | Denton | G06F 16/248 |
| 2017/0075965 A1* | 3/2017 | Liu | G06F 16/27 |
| 2017/0186032 A1 | 6/2017 | Rangasamy Kannadasan et al. | |
| 2017/0372407 A1 | 12/2017 | Konigsberg et al. | |
| 2018/0068358 A1* | 3/2018 | Hoffberg | G07F 17/32 |
| 2018/0121977 A1 | 5/2018 | Yang | |
| 2018/0121979 A1 | 5/2018 | Yang | |
| 2018/0268015 A1* | 9/2018 | Sugaberry | G06N 5/003 |
| 2018/0322540 A1* | 11/2018 | Phadnis | G06Q 30/0277 |
| 2019/0073666 A1* | 3/2019 | Ortiz | G06Q 30/0207 |
| 2019/0138629 A1* | 5/2019 | Kurian | G06F 16/214 |
| 2019/0228020 A1* | 7/2019 | Sawatzky | G06F 16/273 |
| 2019/0347252 A1* | 11/2019 | Kurian | G06F 16/214 |
| 2020/0051147 A1* | 2/2020 | Tsai | G06Q 30/0222 |
| 2020/0142684 A1* | 5/2020 | Kruempelmann | G06F 16/27 |
| 2020/0193493 A1* | 6/2020 | Nagar | G06K 9/6217 |
| 2020/0250730 A1* | 8/2020 | Akbasli | G06Q 30/0629 |
| 2020/0278984 A1* | 9/2020 | Kaushik | G06F 16/178 |
| 2020/0320098 A1* | 10/2020 | Sharma | G06F 16/2282 |
| 2021/0056567 A1* | 2/2021 | Hossain | G06Q 30/0282 |
| 2021/0056595 A1* | 2/2021 | Hossain | G06F 16/27 |
| 2021/0073870 A1* | 3/2021 | Chanda | G06Q 30/0276 |

OTHER PUBLICATIONS

Ariba Network, "CIF Catalog Creation", Ariba, Inc., 2015, 39 pages.
Ariba, Inc., "CIF Catalog Training Guide", 2010, 74 pages.
Pakhomova, Nina, et al., "Detecting and correcting e-commerce catalog misattribution with image and text classification using Google", GridDynamics.com,, Jun. 22, 2017, 10 pages.

* cited by examiner

CHANNEL SYNCHRONIZATION ENGINE WITH CALL CONTROL

FIELD

The present disclosure relates generally to an e-commerce platform for managing online and physical stores, and more specifically to a synchronization engine that controls synchronization of product information to various advertising and marketing channels.

BACKGROUND

A merchant looking to market and sell products may want to make product information available to potential buyers via many different marketing channels. Each channel may have requirements for product data specific to that channel, such as requirements relating to certain product data fields, e.g., a product ID number, a product price, a category of product, a product image, an availability of the product, and the like. It can be very time consuming for a merchant to provide appropriate product information in a suitable format for all the different channels. Past attempts to automate this process have suffered from stress being placed on the repositories containing the product information, such as due to separate synchronizations being required for each channel and pressure on the merchant to resolve any synchronization errors generated by the various channels. There is therefore a need for a more streamlined approach to synchronize product information across storefronts and across channels and to address the various errors encountered as the product information is shared to the different channels.

SUMMARY

In embodiments, a method may include receiving, by a synchronization engine, for at least one storefront, product information for at least one product and at least one selected channel for the at least one product. The synchronization engine may translate, for the at least one storefront, relevant product information to a translated product format for the at least one selected channel and may determine error data relating to the translated product format, wherein the error data includes at least one of an identified error in the translated product format and a corresponding way the identified error is resolved. An analysis of the error data may be performed, and the synchronization engine may determine a recommendation for preventing a future error synchronizing product data for a first storefront with a particular channel based on the analysis.

In embodiments, errors may be consolidated across at least two channels prior to a reporting of identified errors to the at least one storefront. A predictive analytics module may be used to determine how at least one identified error is resolved. A predictive analytics module may be used to determine the recommendation and the recommendation is communicated to the at least one storefront for approval prior to implementation. A predictive analytics module may be used to determine the recommendation and the recommendation may be automatically implemented. The recommendation may be based on error data across a group of storefronts for a particular channel. At least one product information field may be automatically updated for a storefront not included in the group of storefronts based on the analysis of error data. The synchronization engine may use a synchronization data model for translating the product information. The synchronization data model may include product data fields required for each channel supported by the synchronization engine.

In embodiments, a system may include a synchronization engine configured to store a set of instructions that, when executed cause the synchronization engine to receive product information for at least one product for a storefront and at least one selected channel for the at least one product from a commerce management engine, translate the product information to a translated product format for the at least one selected channel, determine at least one error relating to the translated product format, and determine a recommendation for preventing a future error synchronizing product data for the storefront with a particular channel based on an analysis of the at least one error.

In embodiments, the system may include a predictive analytics module that is adapted to generate a suggestion to resolve the at least one error, wherein the suggestion may be communicated to the storefront for approval prior to implementation. A recommendation may be determined using a predictive analytics module to generate a suggestion to resolve an error, wherein the suggestion may be automatically implemented. A recommendation may be determined using an analysis of errors across a group of storefronts for a particular channel. At least one product information field may be updated based on the analysis of errors for a storefront not included in the group of storefronts.

In embodiments, a method may include performing an analysis of error data, by a synchronization engine, wherein the error data includes at least one identified error from a prior synchronization of product information to at least one channel and a corresponding way the at least one identified error is resolved. The synchronization engine may determine a recommendation for preventing a future error synchronizing product data for a storefront with a particular channel based on the analysis.

In embodiments, a predictive analytics module may be used to determine the recommendation and the recommendation is automatically implemented. The recommendation may be based on error data across a group of storefronts for a particular channel. At least one product information field may be automatically updated for a storefront not included in the group of storefronts based on the analysis of error data. The synchronization engine may use a synchronization data model for translating the product information. The synchronization data model may include product data fields required for each channel supported by the synchronization engine.

In embodiments, a system may include a synchronization engine configured to store a set of instructions that, when executed, cause the synchronization engine to estimate, using error data, at least one future synchronization error of product information to one or more channels. Each channel may have one or more respective product data fields for that channel and the error data relates to a prior synchronization of product information from one or more storefronts to the one or more channels and includes at least one of an identified error from the prior synchronization and a corresponding correction for resolving the identified error. The set of instructions, when executed, may cause the synchronization engine to send a request to a commerce management engine associated with the one or more storefronts, wherein the request requests product information for one or more products of the one or more storefronts for a future product synchronization with the one or more channels and includes a request parameter that is based on the at least one estimated future synchronization error.

In embodiments, the request parameter may be a timing parameter that is based on a predicted time of resolution of the at least one estimated future synchronization error. The request parameter may be a timing parameter that includes a specified time period for reporting product information changes for the one or more products of the one or more storefronts which occur in the specified time period. The request parameter may be a timing parameter that includes one or more specified times for reporting product information changes relative to a prior reporting time for the one or more products of the one or more storefronts. The request parameter may include at least one product field of the one or more storefronts. The synchronization engine may be adapted to determine if the one or more channels have any new product data fields required for synchronization. The synchronization engine may be adapted to generate a suggestion to provide relevant product data for a new required product data field, wherein the suggestion may be automatically implemented. The synchronization engine may be adapted to analyze error data across a group of storefronts or a group of products for a particular channel. The synchronization engine may be adapted to analyze error data on a per channel basis to determine a number of estimated future errors per channel. The future product synchronization may be delayed for a specific channel if the number of future errors for the channel is greater than a respective predetermined threshold. The synchronization engine may be adapted to analyze one or more additional factors to determine the request parameter, wherein the one or more additional factors include a criticality of the errors, a current load on a computing resource of the commerce management engine, and a predicted additional load on the commerce management engine based on a request for a specified amount of product information. The synchronization engine, in order to acquire the error data, may be adapted to: receive, for one or more storefronts, product information for products and selected channels for the products, translate, for the one or more storefronts, relevant product information to a translated product format for each respective selected channel, and synchronize each translated product format with the respective selected channel.

In embodiments, a method may include estimating, by a synchronization engine using error data, at least one future synchronization error of product information to one or more channels, wherein each channel has respective product data fields for that channel, wherein the error data relates to a prior synchronization of product information from one or more storefronts to the one or more channels and includes at least one of an identified error from the prior synchronization and a corresponding correction for resolving the identified error. The method may include determining, by the synchronization engine, a load on a computing resource of a commerce management engine associated with the one or more storefronts, wherein the determined load encompasses at least one of a current load and a predicted future load on the computing resource of the commerce management engine, and formulating, by the synchronization engine, a request to the commerce management engine for product information for one or more products of the one or more storefronts for a future synchronization with the one or more channels, wherein the request includes a request parameter that is based on the estimated at least one future synchronization error and the determined load.

In embodiments, the computing resource may include at least one of a network resource, a processing resource, a database resource, a storage resource, and a memory resource. The determined load may comprise a composite load value. A request may be delayed if the composite load value is above a predetermined level. The predetermined level may vary based on a number of future synchronization errors. The determining and formulating steps may be performed in an iterative manner. An amount of product information requested by the request may be decreased if the composite load value is above a predetermined level. A predicted future load on the computing resource of the commerce management engine may be due to at least one of a request for a specified amount of product information or a request for a specified computation.

In embodiments, a method may include estimating, by a synchronization engine using error data, at least one future synchronization error of product information to a plurality of channels. Each channel may have respective product data fields for that channel and the error data may relate to a prior synchronization of product information from one or more storefronts to the plurality of channels and may include at least one of an identified error from the prior synchronization and a corresponding correction for resolving the identified error. The method may include determining whether each channel of the plurality of channels is affected by the at least one future synchronization error to a predetermined extent and delaying a future synchronization of product information to the plurality of channels if a number of channels affected to the predetermined extent is above a predetermined threshold.

In embodiments, each future synchronization error may be categorized based on a type of error. Each future synchronization error may be determined on a per channel basis and a future synchronization of product information to a specific channel is delayed if the specific channel is affected to the predetermined extent. The predetermined extent may relate to a number or a type of future synchronization errors. The future synchronization may be delayed for all the channels of the plurality of channels.

In embodiments, a method may include receiving, by a synchronization engine, for each storefront of a plurality of storefronts, product information for products and selected channels for the products. The synchronization engine may translate, for each storefront, relevant product information to a translated product format for each respective selected channel and may determine error data relating to the translated product formats. The error data may include identified errors in the translated product formats and corresponding ways the identified errors are resolved. An analysis of the error data may be performed and the synchronization engine may determine a recommendation for preventing a future error synchronizing product data for a first storefront with a particular channel based on the analysis.

In embodiments, the synchronization engine may send a communication including the recommendation to the first storefront. The communication may comprise a request for updated product information based on the recommendation. Identified errors may be reported to affected ones of the plurality of storefronts. Errors may be consolidated across at least two channels prior to a reporting of identified errors to affected ones of the plurality of storefronts. A predictive analytics module may be used to determine at least some of the corresponding ways the identified errors are resolved. The predictive analytics module may be used to determine the recommendation and the recommendation may be communicated to one or more of the plurality of the storefronts for approval prior to implementation. The predictive analytics module may be used to determine the recommendation and the recommendation may be automatically implemented. The recommendation may be based on error data across a group of storefronts for a particular channel. At least one product information field may be automatically updated for a storefront not included in the group of storefronts based on the analysis of error data. The first storefront may select the particular channel for corresponding products after the analysis of errors occurs based on the analysis of errors. A particular field of product information may be requested from the first storefront. The synchronization engine may use a synchronization data model for translating the product information. The synchronization data model may include product data fields required for each channel supported by the synchronization engine. The synchronization data model may be updated in real time. The synchronization data model may be updated based at least in part on automatic identification of changes in requirements across channels.

In embodiments, a method may include receiving, by a synchronization engine, product information for products and selected channels for the products for a storefront. The synchronization engine may translate, for each selected channel, the product information to a translated product format for the selected channel. The synchronization engine may determine any errors relating to the translated product formats and may determine a recommendation for preventing a future error synchronizing product data for the storefront with a particular channel based on an analysis of any errors.

In embodiments, the synchronization engine may send a communication to the storefront to request updated product information based on the recommendation. A recommendation may use a predictive analytics module to generate a suggestion to resolve an error, wherein the suggestion may be communicated to the storefront for approval prior to implementation. Determining a recommendation may use a predictive analytics module to generate a suggestion to resolve an error, wherein the suggestion may be automatically implemented. Determining a recommendation may include an analysis of errors across a group of storefronts for a particular channel. At least one product information field may be updated based on the analysis of errors for a storefront not included in the group of storefronts. The synchronization engine may store received product data as a synchronization data model. The synchronization data model may include fields for requirements of each channel supported by the synchronization engine. The synchronization data model may be updated in real time. The synchronization data model may be updated based on automatic identification of changes in requirements across channels.

In embodiments, a method may include performing an analysis of error data, wherein the error data may include identified errors from a prior synchronization, by a synchronization engine, of product information to at least one channel and corresponding ways the identified errors are resolved. The synchronization engine may determine a recommendation for preventing a future error synchronizing product data for a storefront with a particular channel based on the analysis.

In embodiments, the synchronization engine may send a communication including the recommendation to the storefront. The communication may comprise a request for updated product information based on the recommendation. A predictive analytics module may be used to determine the recommendation and the recommendation may be communicated to the storefront for approval prior to implementation. A predictive analytics module may be used to determine the recommendation and the recommendation may be automatically implemented. The recommendation may be based on error data across a group of storefronts for a particular channel. At least one product information field may be automatically updated for a storefront not included in the group of storefronts based on the analysis of error data. The synchronization engine may use a synchronization data model for translating the product information. The synchronization data model may include product data fields required for each channel supported by the synchronization engine. The synchronization data model may be updated in real time.

In embodiments, a system may include a synchronization engine that is adapted to receive, for each storefront of a plurality of storefronts, product information for products and selected channels for the products, translate relevant product information to a translated product format for each respective selected channel, determine error data relating to the translated product formats, wherein the error data may include identified errors in the translated product formats and corresponding ways the identified errors are resolved. The synchronization engine may be adapted to perform an analysis of the error data and determine a recommendation for preventing a future error synchronizing product data for a first storefront with a particular channel based on the analysis.

In embodiments, the synchronization engine may be adapted to send a communication including the recommendation to the first storefront. The communication may comprise a request for updated product information based on the recommendation. The synchronization engine may be adapted to report identified errors to affected ones of the plurality of storefronts. Errors may be consolidated across at least two channels prior to a reporting of identified errors to affected ones of the plurality of storefronts. A predictive analytics module may be used to determine at least some of the corresponding ways the identified errors are resolved. A predictive analytics module may be used to determine the recommendation and the recommendation may be communicated to one or more of the plurality of the storefronts for approval prior to implementation. A predictive analytics module may be used to determine the recommendation and the recommendation may be automatically implemented. The recommendation may be based on error data across a group of storefronts for a particular channel. At least one product information field may be automatically updated for a storefront not included in the group of storefronts based on the analysis of error data. The first storefront may select the particular channel for corresponding products after the analysis of errors occurs based on the analysis of errors. A particular field of product information may be requested from the first storefront. The synchronization engine may use a synchronization data model for translating the product information. The synchronization data model may include product data fields required for each channel supported by the synchronization engine. The synchronization data model may be updated in real time. The synchronization data model may be updated based at least in part on automatic identification of changes in requirements across channels.

In embodiments, a system may include a synchronization engine that is adapted to receive product information for products and selected channels for the products for a storefront, translate, for each selected channel, the product information to a translated product format for the selected channel, determine any errors relating to the translated product formats, and determine, by the synchronization engine, a recommendation for preventing a future error synchronizing product data for the storefront with a particular channel based on an analysis of any errors.

In embodiments, the synchronization engine may be adapted to send a communication to the storefront to request updated product information based on the recommendation. A predictive analytics module may be used to generate a suggestion to resolve an error, wherein the suggestion may be communicated to the storefront for approval prior to implementation. A predictive analytics module may be used to generate a suggestion to resolve an error, wherein the suggestion may be automatically implemented. A recommendation may be determined via an analysis of errors across a group of storefronts for a particular channel. At least one product information field may be updated based on the analysis of errors for a storefront not included in the group of storefronts. The synchronization engine may be adapted to store received product data as a synchronization data model. The synchronization data model may include fields for requirements of each channel supported by the synchronization engine. The synchronization data model may be updated in real time. The synchronization data model may be updated based on automatic identification of changes in requirements across channels.

In embodiments, a system may include a synchronization engine that is adapted to perform an analysis of error data, wherein the error data may include identified errors from a prior synchronization, of product information to at least one channel and corresponding ways the identified errors are resolved and determine a recommendation for preventing a future error synchronizing product data for a storefront with a particular channel based on the analysis.

In embodiments, the synchronization engine may be adapted to send a communication including the recommendation to the storefront. The communication may comprise a request for updated product information based on the recommendation. A predictive analytics module may be used to determine the recommendation and the recommendation may be communicated to the storefront for approval prior to implementation. A predictive analytics module may be used to determine the recommendation and the recommendation may be automatically implemented. The recommendation may be based on error data across a group of storefronts for a particular channel. At least one product information field may be automatically updated for a storefront not included in the group of storefronts based on the analysis of error data. The synchronization engine may use a synchronization data model for translating the product information. The synchronization data model may include product data fields required for each channel supported by the synchronization engine. The synchronization data model may be updated in real time.

In embodiments, a method may include estimating, by a synchronization engine using error data, future synchronization errors of product information to one or more channels. Each channel may have respective product data fields for that channel and the error data may relate to a prior synchronization of product information from one or more storefronts to the one or more channels and may include identified errors from the prior synchronization and corresponding corrections for resolving at least a subset of the identified errors. The synchronization engine may formulate a request to a commerce management engine associated with the one or more storefronts, wherein the request requests product information for one or more products of the one or more storefronts for a future product synchronization with the one or more channels and may include a request parameter that may be based on the estimated future synchronization errors.

In embodiments, the synchronization engine may send the request to the commerce management engine. The request parameter may be a timing parameter that may be based on a predicted time of resolution of at least some of the estimated future synchronization errors. The request parameter may be a timing parameter that may include a specified time period for reporting product information changes for the one or more products of the one or more storefronts which occur in the specified time period. The request parameter may be a timing parameter that may include one or more specified times for reporting product information changes relative to a prior reporting time for the one or more products of the one or more storefronts. The request parameter may include specified products or product fields of the one or more storefronts. The estimating step may comprise determining if the one or more channels have new product data fields required for synchronization. The method may further include generating a suggestion to provide relevant product data for a new required product data field, wherein the suggestion may be automatically implemented. The estimating step may comprise analyzing error data across a group of storefronts or a group of products for a particular channel. The estimating step may comprise analyzing error data on a per channel basis to determine a number of estimated future errors per channel, and the future product synchronization may be delayed for a specific channel if the number of future errors for the channel is greater than a respective predetermined threshold. The method may include analyzing one or more additional factors to determine the request parameter, wherein the one or more additional factors include a criticality of the errors, a current load on a computing resource of the commerce management engine, and a predicted additional load on the commerce management engine based on a request for a specified amount of product information.

In embodiments, the error data may be acquired by receiving, by the synchronization engine, for each storefront of a plurality of storefronts, product information for products and selected channels for the products, translating, by the synchronization engine for each storefront, relevant product information to a translated product format for each respective selected channel; and determining, by the synchronization engine, identified errors in the translated product formats and corresponding ways the identified errors are resolved.

In embodiments, a method may include estimating, by a synchronization engine using error data, future synchronization errors of product information to one or more channels. Each channel may have respective product data fields for that channel, and the error data may relate to a prior synchronization of product information from one or more storefronts to the one or more channels and may include identified errors from the prior synchronization and corresponding corrections for resolving at least a subset of the identified errors. The synchronization engine may determine a load on a computing resource of a commerce management engine associated with the one or more storefronts, wherein the determined load encompasses a current load and/or a predicted future load on the computing resource of the commerce management engine. The synchronization engine may formulate a request to the commerce management engine for product information for one or more products of the one or more storefronts for a future synchronization with the one or more channels, wherein the request may include a request parameter that may be based on the estimated future synchronization errors and the determined load.

In embodiments, the computing resource may include at least one of a network resource, a processing resource, a database resource, a storage resource, and a memory resource. The determined load may comprise a composite load value. A request may be delayed if the composite load value may be above a predetermined level. The predetermined level may vary based on a number of future synchronization errors. The determining and formulating steps may be performed in an iterative manner. An amount of product information requested by the request may be decreased if the composite load value is above a predetermined level. A predicted future load on the computing resource of the commerce management engine may be due to a request for a specified amount of product information and/or a request for a specified computation.

In embodiments, a method may include estimating, by a synchronization engine using error data, future synchronization errors of product information to a plurality of channels, wherein each channel has respective product data fields for that channel. The error data may relate to a prior synchronization of product information from one or more storefronts to the plurality of channels and may include identified errors from the prior synchronization and corresponding corrections for resolving at least a subset of the identified errors. A determination may be made whether each channel of the plurality of channels is affected by the future synchronization errors to a predetermined extent. A future synchronization of product information to the plurality of channels may be delayed if a number of channels affected to the predetermined extent is above a predetermined threshold.

In embodiments, the future synchronization errors may be categorized based on a type of error. The future synchronization errors may be determined on a per channel basis and a future synchronization of product information to a specific channel may be delayed if the specific channel is affected to the predetermined extent. The predetermined extent may relate to a number or a type of future synchronization errors. The future synchronization may be delayed for all the channels of the plurality of channels. Product information may be synchronized to the plurality of channels once the future synchronization errors are resolved. Product information may be synchronized to a channel of the plurality of channels if the future synchronization errors are resolved such that the channel is no longer affected to the predetermined extent. Product information may be synchronized to the plurality of channels if the future synchronization errors are resolved such that the number of channels affected is below the predetermined threshold.

In embodiments, a system may include a synchronization engine, wherein the synchronization engine is adapted to estimate, using error data, future synchronization errors of product information to one or more channels, wherein each channel has respective product data fields for that channel. The error data may relate to a prior synchronization of product information from one or more storefronts to the one or more channels and may include identified errors from the prior synchronization and corresponding corrections for resolving at least a subset of the identified errors. The synchronization engine may be adapted to formulate a request to a commerce management engine associated with the one or more storefronts, wherein the request requests product information for one or more products of the one or more storefronts for a future product synchronization with the one or more channels and may include a request parameter that is based on the estimated future synchronization errors.

In embodiments, the synchronization engine is adapted to send the request to the commerce management engine. The request parameter may be a timing parameter that may be based on a predicted time of resolution of at least some of the estimated future synchronization errors. The request parameter may be a timing parameter that may include a specified time period for reporting product information changes for the one or more products of the one or more storefronts which occur in the specified time period. The request parameter may be a timing parameter that may include one or more specified times for reporting product information changes relative to a prior reporting time for the one or more products of the one or more storefronts. The request parameter may include specified products or product fields of the one or more storefronts. The estimating step may comprise determining if the one or more channels have new product data fields required for synchronization. A suggestion to provide relevant product data for a new required product data field may be generated, wherein the suggestion may be automatically implemented. The estimating step may comprise analyzing error data across a group of storefronts or a group of products for a particular channel. The estimating step may comprise analyzing error data on a per channel basis, to determine a number of estimated future errors per channel. A future product synchronization may be delayed for a specific channel if the number of future errors for the channel is greater than a respective predetermined threshold. The synchronization engine may be adapted to analyze one or more additional factors to determine the request parameter, wherein the one or more additional factors include a criticality of the errors, a current load on a computing resource of the commerce management engine, and/or a predicted additional load on the commerce management engine based on a request for a specified amount of product information. In embodiments, the synchronization engine may be adapted to acquire the error data by receiving, for each storefront of a plurality of storefronts, product information for products and selected channels for the products, translating, for each storefront, relevant product information to a translated product format for each respective selected channel, and determining, by the synchronization engine, identified errors in the translated product formats and corresponding ways the identified errors are resolved.

In embodiments, a system includes a synchronization engine that is adapted to estimate, using error data, future synchronization errors of product information to one or more channels. Each channel may have respective product data fields for that channel. The error data may relate to a prior synchronization of product information from one or more storefronts to the one or more channels and may include identified errors from the prior synchronization and corresponding corrections for resolving at least a subset of the identified errors. The synchronization engine may determine a load on a computing resource of a commerce management engine associated with the one or more storefronts. The determined load may encompass a current load and/or a predicted future load on the computing resource of the commerce management engine. The synchronization engine may formulate a request to the commerce management engine for product information for one or more products of the one or more storefronts for a future synchronization with the one or more channels. The request may include a request parameter that may be based on the estimated future synchronization errors and the determined load.

In embodiments, the computing resource may include a network resource, a processing resource, a database resource, a storage resource, and/or a memory resource. The determined load may comprise a composite load value. A request may be delayed if the composite load value is above a predetermined level. The predetermined level may vary based on a number of future synchronization errors. The determining and formulating steps may be performed by the synchronization engine in an iterative manner. An amount of product information requested by the request may be decreased if the composite load value is above a predetermined level. A predicted future load on the computing resource of the commerce management engine may be due to a request for a specified amount of product information and/or a request for a specified computation.

In embodiments, a system may include a synchronization engine that is adapted to estimate, using error data, future synchronization errors of product information to a plurality of channels. Each channel may have respective product data fields for that channel. The error data may relate to a prior synchronization of product information from one or more storefronts to the plurality of channels and may include identified errors from the prior synchronization and corresponding corrections for resolving at least a subset of the identified errors. The synchronization engine may be adapted to determine whether each channel of the plurality of channels is affected by the future synchronization errors to a predetermined extent. A future synchronization of product information to the plurality of channels may be delayed if a number of channels affected to the predetermined extent is above a predetermined threshold.

In embodiments, the future synchronization errors may be categorized based on a type of error. The future synchronization errors may be determined on a per channel basis and a future synchronization of product information to a specific channel may be delayed if the specific channel is affected to the predetermined extent. The predetermined extent may relate to a number or a type of future synchronization errors. The future synchronization may be delayed for all the channels of the plurality of channels. The synchronization engine may be adapted to synchronize product information to the plurality of channels once the future synchronization errors are resolved. The synchronization engine may be adapted to synchronize product information to a channel of the plurality of channels if the future synchronization errors are resolved such that the channel is no longer affected to the predetermined extent. The synchronization engine may be adapted to synchronize product information to the plurality of channels if the future synchronization errors are resolved such that the number of channels affected is below the predetermined threshold.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
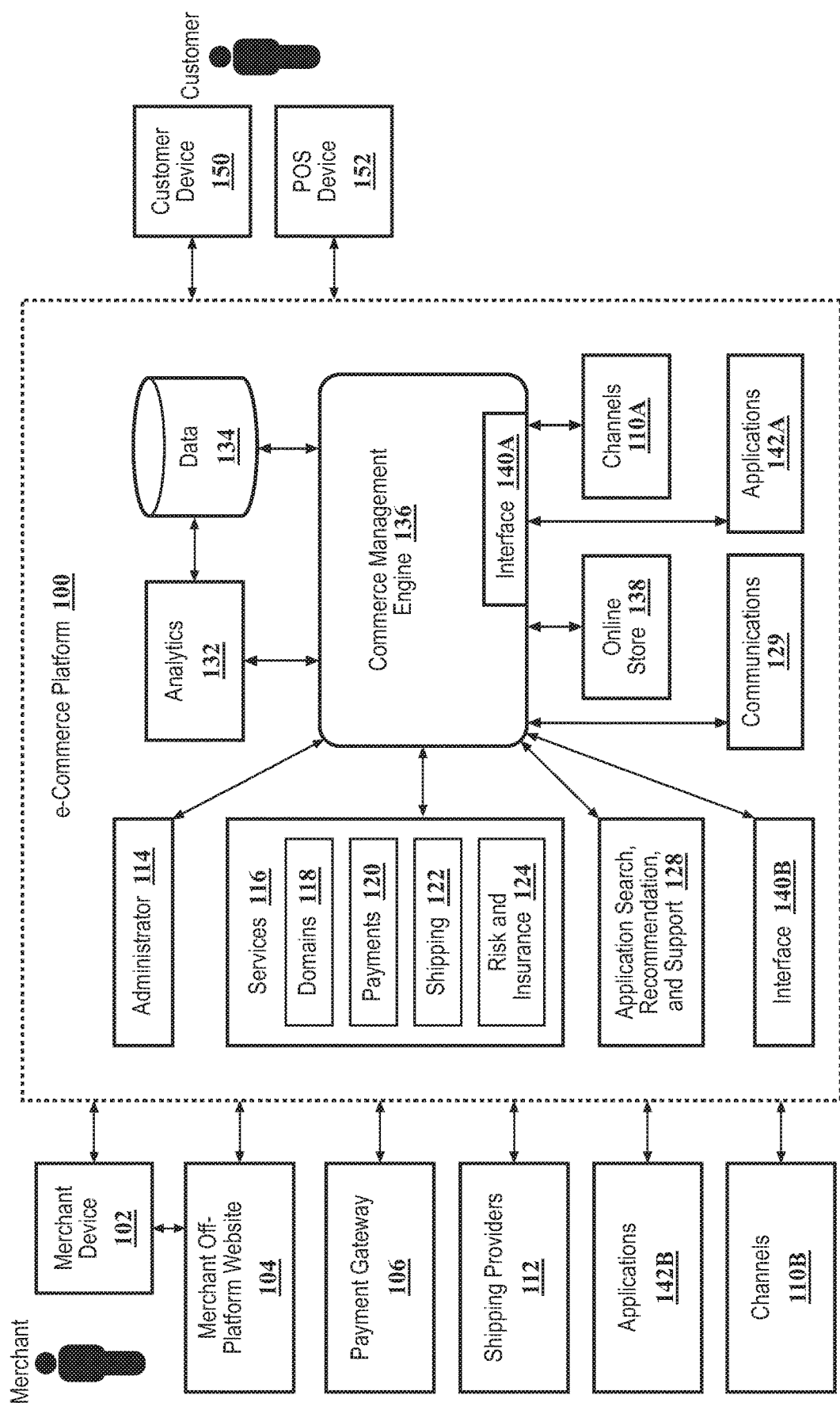
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store). Throughout this disclosure the terms online store 138 and storefront may be used in connection with an online e-commerce presence, an offline commerce presence (such as a physical store), an online channel, an offline channel, a channel 110A internal to the platform 100, a channel 110B external to the platform 100, or the like, or any combination of the foregoing.

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
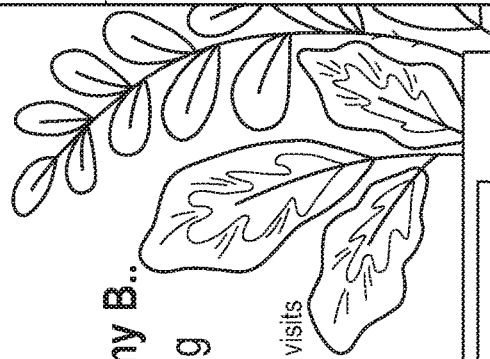
FIG. 2 depicts an embodiment for a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Figure 3:
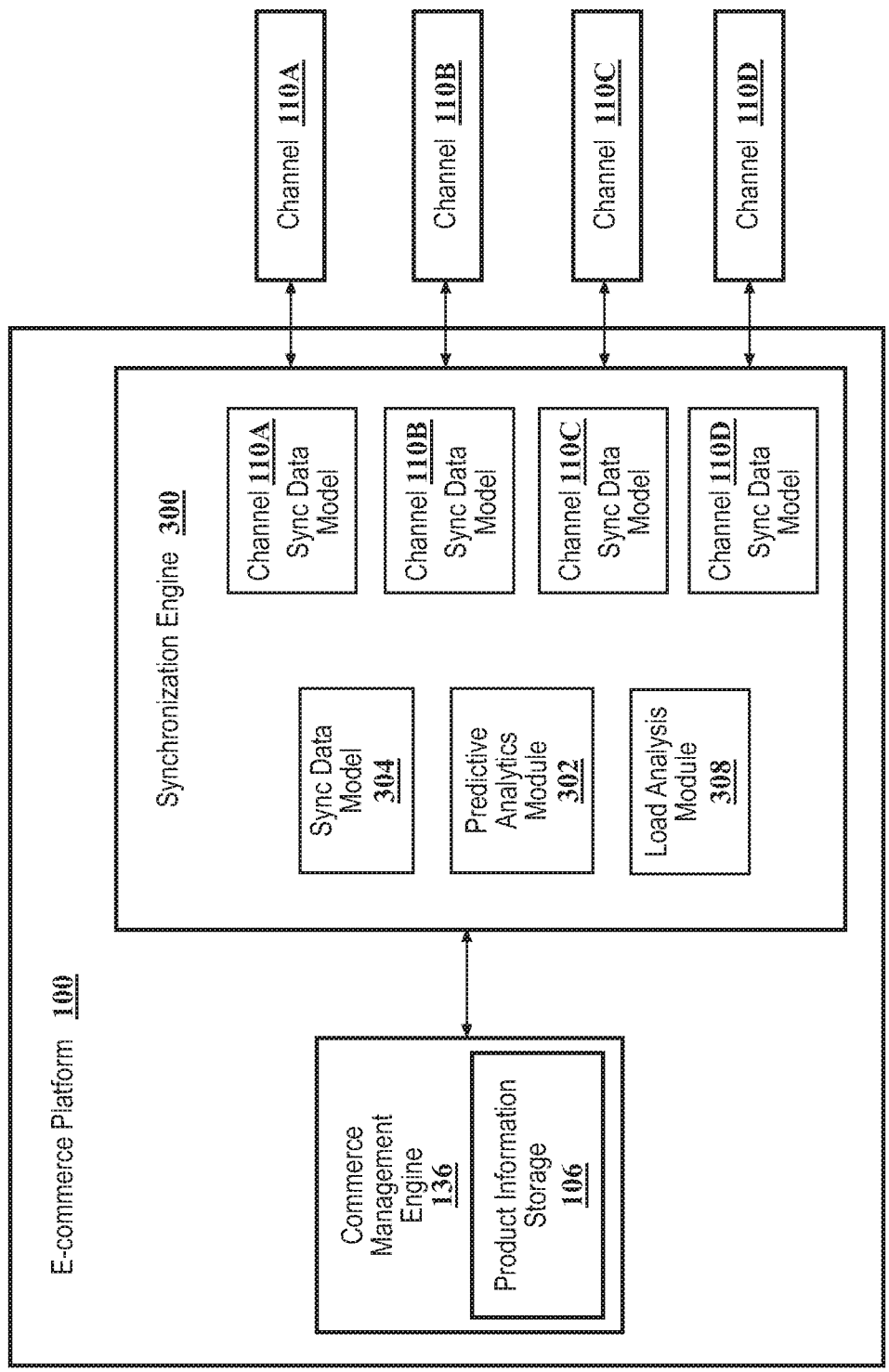
FIG. 3 depicts an embodiment of a block diagram of a synchronization engine.

FIG. 3 depicts an exemplary block diagram for a synchronization engine 300 (or sync engine 300) in communication with commerce management engine 136 and which is enabled to synchronize product data for each of one or more storefronts in communication with various different channels (channels 110A-N), where each channel may have different requirements for product information. The product data may be stored in product data storage 306, which may be a component of the commerce management engine 136 or the e-commerce platform 100. As shown, synchronization engine 300 is a component of e-commerce platform 100, although it may also be a separate component. Similarly, a channel 110 may be part of the platform 100 (e.g. channel 110A) or external to it (e.g. channel 110B).

As used herein, a channel 110 is any way (such as a platform or application) to bring or present product information to consumers, and a channel 110 may have sub-channels or sub-components, where product information requirements may vary by channel and sub-channels or sub-components. A channel 110 may include functionality for targeting and/or displaying advertisements to users associated with the channel and may have or be associated with an API for synchronization and sharing of product data. A channel 110 may require a copy of a merchant's product catalog (e.g., a list of products and certain information for each product). Examples of channels 110 include social media platforms, search platforms, advertising platforms, messaging platforms, e-commerce platforms, news sites, blogs, and the like, such as FACEBOOK® (with sub-channels such as FACEBOOK® Commerce, FACEBOOK® Marketing), TWITTER®, INSTAGRAM GOOGLE® (including GOOGLE® Shopping Ads), YAHOO®, and the like.

As used herein, product information may include any information or data associated with a product or a set of products, and may include various product data fields such as availability of a product (e.g., in stock, out of stock, an inventory count), a product category (e.g., apparel, electronics), global trade item number (GTIN), universal product code (UPC), manufacturer part number (MPN), brand, gender (e.g., male, female, unisex), condition (e.g., new, used, fair, excellent), manufacture color, color, age group (e.g., 18-24 months), department, size type (men, women, plus sizes), size (e.g., small, medium, 6, 8, 10), price, product feedback and reviews, and the like. Each product data field may have a required format. As used herein, product information may include a product catalog. Each channel 110 may have its own requirements for which product data fields are required.

The synchronization engine 300 is enabled to synchronize appropriate product information for each particular merchant or storefront on the e-commerce platform 100 to each of one or more channels 110 (including sub-channels or channel sub-components) selected by or for the particular merchant or storefront. The synchronization engine 300 may use a synchronization data model 304 (or sync data model 304) in connection with synchronization, wherein the synchronization data model 304 includes information regarding the specifications and requirements for each channel 110, such as based on information made available by a channel, templates for a channel, information inferred from an API associated with a channel, or based on error data, as described more fully elsewhere herein. For example, a particular channel 110 may require certain product data fields in certain formats or require that a completely updated product catalog be communicated periodically (e.g., each month) to the channel 110. A particular channel's 110 required product data fields may change over time.

In embodiments, the e-commerce platform 100 may store the product information (such as associated with a storefront and/or merchant) in the commerce management engine 136 for example, and the synchronization engine 300 may be configured to receive (new or updated) product information posted by the e-commerce platform 100, e.g., via a webhook, or via a request/response mechanism, such as by an API request to the platform and a response from the platform. The synchronization engine 300 may also correctly format the necessary product information to be shared with or pushed to one or more selected channels 110A-N. Thus, the product information may need to be obtained only once by the synchronization engine 300 and can then be synchronized to multiple channels, which may reduce load and stress on the e-commerce platform 100 and the commerce management engine 136 as compared to having a separate request for each channel. In embodiments, such as by using a specified product data field, the e-commerce platform 100 may provide (or the synchronization engine 300 may request), information or data updated since the last provision of or request for information. For example, the synchronization engine 300 may request prices for a list of products and the commerce management engine 136 may return only those prices that have changed since the time of the last request for such information. In embodiments, such as by using a specified product data field, the platform may provide (or the synchronization engine 300 may request) information or data for a specified window of time. In embodiments, the platform may return appropriate information and data limited to changes since the prior similar request based upon the request from the synchronization engine 300.

The synchronization engine 300 may request data based on a time window for which product information (or changes in product information) should be provided. For example, a time window may be from the last time product information was obtained and just the changed information since then may be provided. The synchronization engine 300 may also specify how frequently an update should be sent or requested from the platform. The synchronization engine 300 may specify what data is to be sent or requested (e.g., for which products, storefronts, and/or channels).

As used herein, error data may include identified errors from synchronization with channels and information regarding how errors are resolved. Error data may also include how long the errors took to resolve. Typically, a channel 110 will provide an error message, such as to the synchronization engine 300, if there is an identified error in any field of the product information as data is shared with or pushed to the channel 110, such as missing data, an incorrect format, a publication error, and the like. For example, suppose a specific channel 110 requires that a product have a description, a price, an image, a barcode type ID (such as GTIN or MPN), and a title with less than 100 characters. The specific channel 110 may report whether the product information supplied meets these requirements, including whether or not the data fields are correctly formatted. For example, the specific channel 110 may report that the product is missing an image, missing a title, or missing a GTIN. The channel 110 may report that the product data is not formatted correctly, e.g., a GTIN should not include hyphens or dashes. The channel 110 may also simply report that an error exists. The channel 110 may report that a certain type or types of errors took a certain time to be resolved.

In embodiments, the synchronization engine 300 and/or the platform 100 may compile and analyze the error data in various manners, such as aggregating errors across channels, determining how the errors are resolved, determining the timeliness of the resolution of the errors (for example, how long it took to resolve a particular error or type of error), and the like. For example, information regarding how an error is overcome, e.g., one or more actions previously taken such as by a merchant or automatically by the platform 100 or the synchronization engine 300, may provide useful intelligence in analyzing, predicting, and resolving subsequent errors.

The synchronization engine 300 may aggregate the error data in various ways in order to help determine product data field requirements for a channel, to provide recommendations for merchants for resolving errors or preventing errors, and to determine appropriate parameters for subsequent product information requests. In embodiments, the error data may be aggregated for each storefront, across a plurality of storefronts, the platform, or a subset of the platform, such as by industry, by geography, by jurisdiction, by storefronts using particular channels, or the like. For example, the error data corresponding to new product requirements for a social media channel for storefront owners in one geographical area may be aggregated and used for providing recommendations to storefront owners in other geographical areas. As used herein, the term storefront may also refer to a merchant or user associated with a storefront.

In embodiments, an analysis by the synchronization engine 300 may result in a recommendation for a particular storefront for preventing a future error on a particular channel 110. The synchronization engine 300 may provide a recommendation to the storefront (e.g., to the corresponding merchant) wherein the recommendation includes a request for updating product information, such as by adding product data to a particular product data field. In embodiments, the recommendation may be automatically implemented, with the required product data fields updated on the e-commerce platform 100.

Figures 4, 5A:
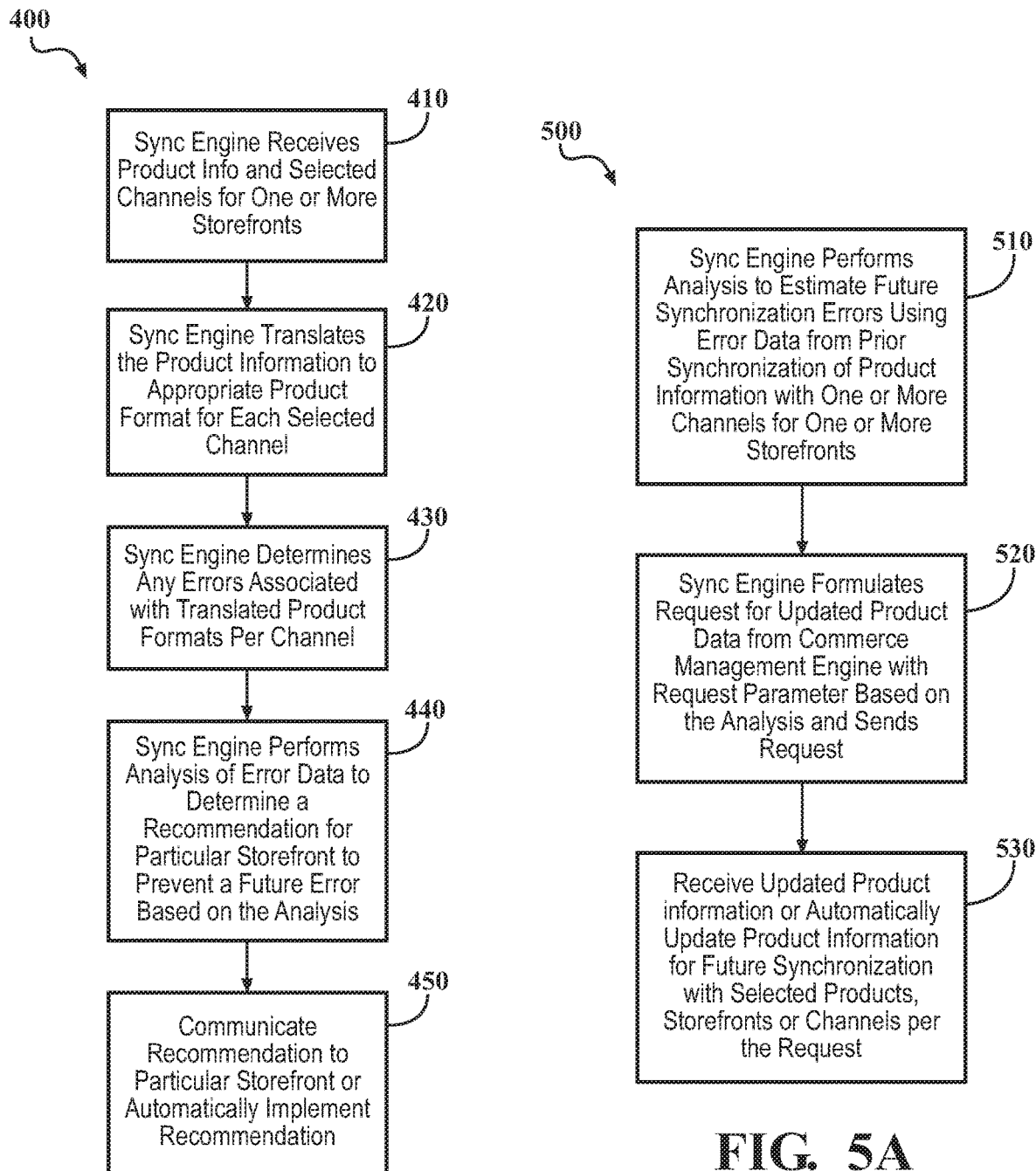
FIG. 4 depicts an exemplary process for using error data from a synchronization of product data to one or more channels to determine a recommendation for preventing a future synchronization error.
FIG. 5A depicts an exemplary process for using error data from a prior synchronization of product data to one or more channels to control a parameter of a request for product information from the e-commerce platform.

With reference to FIG. 4, an exemplary process is shown which uses error data from a current or previous synchronization of product data to one or more selected channels to provide recommendations for preventing synchronization errors for one or more storefronts for one or more particular channels. A recommendation may be provided to a merchant user associated with a product or storefront or may be used by the synchronization engine 300 to automatically update the product information associated with a product.

At a step 410, the synchronization engine 300 receives product information for products requiring synchronization and the selected channels to which the product information is to be synchronized. The product information may be associated with one or more storefronts. For example, a first storefront may select channels A, B, and C for marketing its products 1-10, a second storefront may select channels A, D, and F for marketing its products 1-100, and a third storefront may select channels B and G for marketing its products 1-2000.

At a step 420, the synchronization engine 300 acts to convert or translate, for each selected channel 110, the product information to a translated (converted) product format for the selected channel. This involves selecting and/or formatting the appropriate data needed for each required product data field of each individual channel. In embodiments, the synchronization data model 304 may be used by the synchronization engine 300, wherein the synchronization data model includes the required product data fields that correspond to each supported channel.

At a step 430, the synchronization engine 300 determines any errors relating to the translated product formats, such as by receiving and processing errors from the channels. In embodiments, feedback from a channel may include specific types of identified errors while in some cases, feedback from a channel may simply indicate that an error exists, without specifying in particular what the error is. In some embodiments, the synchronization engine 300 has access to error data relating to a previous synchronization, wherein the error data may include identified errors and ways the identified errors were resolved for the previous synchronization. The error data may include data from one or more different storefronts, various products, and various channels.

At a step 440, the synchronization engine 300 analyzes the current errors and/or the error data from previous synchronizations in order to determine one or more recommendations for one or more storefronts to prevent future synchronization errors. In embodiments, error data generated across storefronts can be used to notify a particular storefront in advance of an action that should be taken to avoid an error in the future, as for example, when the storefront selects a new channel and new product information requirements exist that are different than requirements for other selected channels. In another example, a storefront may be informed in advance of impending channel requirements. For example, if several storefronts in a particular geographic region have encountered errors for a particular channel noting that a GTIN is now required for each product, a storefront using that channel in a different geographic region may be notified to provide GTIN information for each product, in order to not encounter errors when that channel eventually brings the GTIN requirement to the merchant's geographic region.

The recommendations may have varying levels of specificity and apply to one or more products of a storefront. In embodiments, a recommendation may indicate a corresponding product data field for which particular information is needed (e.g., Products 1-5 need GTIN); a recommendation may indicate a rule regarding correct formatting of the product field (e.g., GTIN field includes numbers only with no special characters); a recommendation may indicate specific product information for a missing product field (e.g., Products 5-10 should include Women's Apparel for Product Category); a recommendation may provide the correct formatting for an incorrectly formatted product field (e.g., Product 7's 14 digit GTIN should be 00012345600012). In order to determine a recommendation for an error on a particular channel, the synchronization engine 300 may use error data from the same channel to determine what the problem might be and may use information regarding how similar errors were resolved. For example, a particular channel may have recently added a category as a required product field for a certain group of products and the synchronization engine 300 may use that knowledge to provide a recommendation that a category is needed to be specified for a product and may provide a suggested category for a particular product. As a further example, a particular channel may have recently started using a 14 digit GTIN rather than a 12 digit GTIN, and a recommendation may include the suggestion that two leading zeros be added to modify a 12 digit GTIN to a 14 digit GTIN.

In embodiments, a predictive analytics module 302 as shown in FIG. 3 may be used to provide recommendations to prevent future errors. The synchronization engine 300 may automatically implement recommendations in a manner such that merchants do not have to provide input. For example, if a channel has a new required field for a category of a product, the predictive analytics module may use previous error data across one or more storefronts to analyze and predict information that may be used to pre-populate a category field for various products. For example, a television may automatically be provided with a corresponding 'Electronics' category associated with it when required for a particular channel. The predictions may have a degree of confidence associated with them, such that for example, high confidence predictions (e.g., associated with a first confidence level) are automatically implemented, medium confidence predictions (e.g., associated with a second confidence level lower than the first) are provided with suggestions that are flagged for a storefront to review prior to implementation, and low confidence predictions (e.g., associated with a third confidence level lower than the first and the second) are not automatically implemented but communicated to a storefront.

At a step 450, the synchronization engine 300 may send a communication to one or more of the plurality of storefronts with the recommendation, such as to request product information for newly required product data fields for a particular channel, or to approve of a particular recommendation prior to implementation. For example, a communication may be sent to a merchant that a channel has a new requirement for a 14 GTIN or a new requirement for multiple images of different sides of a product, or the like. In embodiments, the synchronization engine 300 may (automatically) implement a recommendation without communicating the recommendation to the merchant or after approval by the merchant. For example, the synchronization engine 300 may provide a suggested category for a product and automatically add the category to the product information.

In embodiments, the synchronization data model for a channel 110 may be updated in real time, such as based on error data, including the identified errors from synchronizations, successful ways for resolving identified errors, and unsuccessful ways of attempting to resolve identified errors. In embodiments, error data may provide insight into new product data field requirements for various channels. The synchronization data model may also be updated based on reviewing, crawling, or polling channels periodically to identify changes in requirements. For example, a channel may indicate that it now requires a GTIN for a product where it did not previously have that requirement, and the synchronization engine 300 may provide communication to one or more storefronts using the channel to provide a recommendation regarding updating product information to include a GTIN having a specified format.

In embodiments, identified errors may be reported to a storefront, where a number of errors to be presented to and/or directly addressed by a storefront may be reduced, such as by combining similar errors across multiple channels (e.g., associated with varying degrees or levels of the same or similar requirements. For example, if two channels provide error feedback that GTINs are now required for a particular product (e.g., 12 and 14 digit GTINs required), instead of presenting the error twice to a storefront, the errors may be consolidated and one error (e.g., associated with the more stringent requirement between the two), may be presented (e.g., the 14-digit GTIN), while possibly noting that the two channels require a GTIN to be provided. As another approach, errors may be corrected by revising the product information stored on the platform. In this manner, a single error may be presented for one channel but not presented for the other channel. By updating product information a single time on the platform, the errors can be addressed for both channels. In other words, errors may be corrected or addressed through revising and/or updating the product information stored on the platform (i.e., the source data) and not on the channel. In this manner, it may be possible to present an error for one channel, but not present the similar error for the other channels, because once the error is corrected for one channel (e.g., the error with the more stringent requirement) via the source data it will be corrected for all the channels.

The synchronization engine 300 may synchronize product information to a plurality of channels, where each channel has respective product data fields required for that channel. Information regarding prior synchronization errors, types of errors, how an error is overcome, e.g., one or more actions previously taken such as by a merchant or automatically by the platform 100 or the synchronization engine 300, along with timing information of resolution, may provide useful intelligence in analyzing, predicting, and resolving future errors. For example, the synchronization engine 300 may estimate a number and/or type of future synchronization errors based on the error data of one or more prior synchronizations. The estimated future synchronization errors may also be used to determine the timing of a future synchronization. The estimated synchronization errors may also be used as to determine the timing of and an amount of data requested in a request for product information sent to the commerce management engine 136 (or, throughout this disclosure, other aspects of the platform 100 or data stores of information) for a future synchronization in order to minimize a load on (or not unduly stress) the commerce management engine 136 (or, throughout this disclosure, other aspects of the platform 100 or data stores of information) in responding to the request.

In embodiments, the synchronization engine 300 may dynamically adjust parameters associated with a request to the commerce management engine 136 for product information for a future product synchronization based on one or more factors in order to reduce or minimize errors that occur in a future synchronization and/or to reduce or minimize a load on, not unduly stress, or to optimize a performance of the commerce management engine 136. Parameters associated with a request for product information which may be adjusted may include a timing parameter of the request (which relates to when the commerce management engine 136 must respond) and an amount of data requested, such as on a specific product, data field, storefront, and/or channel basis. Typically, the more data and/or computation requested at a specific time, the greater is the burden on the computing resources of the commerce management engine 136.

In embodiments, the potential factors to be analyzed to determine the parameters of the request may include an estimation of a number or type of future synchronization errors, a predicted time of resolution of errors, a determined current load on computing resources of the platform 100 or commerce management engine 136, and a predicted additional load on computing resources of the platform 100 or commerce management engine 136 that a request of a specified amount of product data or computation would cause. Other factors to be considered may include a number of channels impacted by future errors, a criticality of the errors, and the like.

For example, if many products require being synchronized to a particular channel 110 that has recently implemented a new requirement for product data for each product, such as a required category, a synchronization may be delayed so that the potential errors can be addressed before a request for this data is made and before a synchronization of those products is attempted with the particular channel 110 (e.g., the product information field for category can be updated or corrected for those products of a storefront that need to be updated or corrected). This may reduce pressure or a load on the platform 100 and/or the commerce management engine 136 because if the request for product information was not delayed, the commerce management engine 136 may not be able to provide the relevant product information to update the product data fields and the request would have to be repeated. In addition, if the request required computation, the computations may be started, using computing resources, but unable to be completed, thereby wasting computing resources on requested computations which cannot be completed with the current product information. Also, without the updated product information, many synchronization errors would be returned from the particular channel 110 which would need to be resolved and then the data would have to be synchronized again. Allowing enough time for updating product data fields at the commerce management engine 136 allows for a synchronization for most of the product data fields to be correct the first time and uses fewer computing resources.

With reference to FIG. 5A, an exemplary process 500 is shown which uses error data from one or more prior synchronizations of product data to one or more channels to determine one or more request parameters related to requesting updated product information from the commerce management engine 136 for a future product synchronization. In this manner, future synchronization errors may be avoided and an additional load on the e-commerce platform 100 and/or commerce management engine 136 may be reduced (as compared to a synchronization not correcting the errors).

At a step 510, the synchronization engine 300 performs an analysis of error data from a prior synchronization of product information with one or more channels 110. The error data may include identified errors from synchronization with channels and information regarding how errors are resolved and how long the errors took to be resolved. In embodiments, information regarding how an error is overcome, e.g., one or more actions previously taken such as by a merchant or automatically by the platform 100 or the synchronization engine 300, as well as actions that did not result in an error being overcome, may provide useful intelligence in analyzing and resolving future errors and provide information regarding how many errors may need to be corrected, which errors may automatically be corrected, and how to formulate requests to the platform 100 to allow for missing product information to be added (such as by allowing for appropriate time).

The synchronization engine 300 may aggregate the error data in various ways in order to help determine product data field requirements for a channel 110, to provide recommendations for merchants for future synchronizations, and to determine appropriate parameters for subsequent product information requests. As described elsewhere herein, the analysis may make use of the predictive analytics module 304, and may aggregate data across one or more storefronts, channels, the entire platform 100, or a subset of the platform 100.

At a step 520, the synchronization engine 300 formulates one or more requests to the commerce management engine 136 to report updated product information for one or more products, storefronts and/or channels, wherein each request includes at least one request parameter based on the analysis. Parameters of a request may include how often or over what time period product data is requested, whether all product information or just product information changes are to be reported, a set of specified times for which the product information or product information changes are to be reported (which may be a periodic schedule), and/or a set of one or more specified products or product fields for which product information or product information changes is to be reported, such as on a per product, per storefront, and/or per channel basis. Control of the parameters in a request for product information allows for future errors to be minimized in a future product synchronization and allows for an additional load on the commerce management engine 136 or e-commerce platform 100 to be reduced.

For example, if many errors for one or more storefronts are anticipated due to trends in overall error data or due to implementation of new product information fields being required for one or more channels 110, a product data synchronization may be delayed for one or more products (or storefronts or channels) in order to allow time for potential errors to be reported and addressed prior to requesting the data from the commerce management engine 136. The synchronization engine 300 may allow less delay for potential errors that may be automatically corrected, such as by correcting the formatting, as compared to anticipated errors that require user input. Additionally, the specific data requested may be reduced in size, such as by requesting only product information that has changed from a previous synchronization or from a specified set of one or more products for which the product information is expected to be complete, or staggering requests based on product, industry, storefront, or channel in order to minimize or reduce an additional load on the commerce management engine 136.

For example, product information related to products 1-100 may need to be updated, and the synchronization engine 300 may determine that product information for products 30-60 are likely to have errors relating to lack of appropriate images for a particular channel. In such a case, the synchronization engine 300 may omit products 30-60 from an initial request for product information to the commerce management engine 136, and may later present a set of requests for execution at different times to the commerce management engine 136, such as a request for products 1-29 and 61-100 at time 1, a request for products 30-40 at a time 2, and a request for products 41-60 at a time 3. A request could also vary by product data field for a particular product, such as requesting a price for each product 1-100 but not images for products 30-60. In this manner, there is a reduced load on the commerce management engine 136, because fewer computing resources are needed to fulfill a smaller data request than a larger data request. The criticality of future errors may also be considered in a formulation of a request for product information for a future product synchronization. For example, it may be determined that certain product fields are not as critical as others and a synchronization may not be delayed, even knowing that synchronization errors may exist. For example, a certain channel may require a product image, but if a product is selling well without an image, such an error may be disregarded or deprioritized in the analysis.

In embodiments, an estimated number of future synchronization errors may be determined, and a future product synchronization may be delayed if the estimated number of future errors is above a predetermined threshold. For example, product information related to products 1-1000 may need to be updated, with an update scheduled for a time T1. With a predetermined threshold set at 50% of the number of products, the synchronization engine 300 may determine that product information for 600 products is likely to have errors relating to lack of a specified category for the product, which was determined to be a new product data field for a particular channel. In this example, a timing parameter of a request may specify that products 1-1000 not be synchronized until a delayed time T2. Alternatively, a timing parameter of a request may specify that the 600 products likely to have errors not be synchronized until a delayed time T3. Many other request formulations are also possible.

In embodiments, the synchronization engine 300 may determine an estimated number of channels affected by any errors, or determine a number of errors of a certain type. For example, if a large number of a particular type of error is determined to exist for one or more channels (e.g. many product images are missing), a synchronization of product information with those channels would result in many errors that would need to be addressed. If product images are determined to be critical to a channel, there is no sense requesting product information for synchronization with that channel or attempting a synchronization until the product information is appropriately updated on the e-commerce platform 100. A predetermined threshold of a number of channels affected, or a number of errors per channel, or a number of errors of a particular type may also be set, which if exceeded, may act to delay a future synchronization for all channels or an affected channel, or which may result in a modification of a request parameter (for example, to include only those products for which images have been provided, so other information for those products may be updated).

In embodiments, an analysis by the synchronization engine 300 may result in a recommendation for a particular storefront for preventing a future error on a particular channel 110. The synchronization engine 300 may provide a recommendation to the storefront (and the corresponding merchant) wherein the recommendation includes a request for updating product information, such as by adding product data to a particular product data field. For example, an analysis of which other channels may be affected by missing product images may be performed, wherein these potential future errors can be automatically fixed for the other channels when the images are provided for one channel. In embodiments, the recommendation may be automatically implemented, with the required product data fields updated on the e-commerce platform 100. For example, for a product data field that requires a 14 digit GTIN, the synchronization engine 300 may automatically convert an 11 digit GTIN to a 14 digit GTIN, without delaying a request for subsequent product information for a future synchronization.

At a step 530, the synchronization engine 300 may receive the product information requested, and/or automatically correct some product data fields, and proceed with a synchronization of product information, for one or more storefronts, with one or more selected channels.

Figures 5B, 5C:
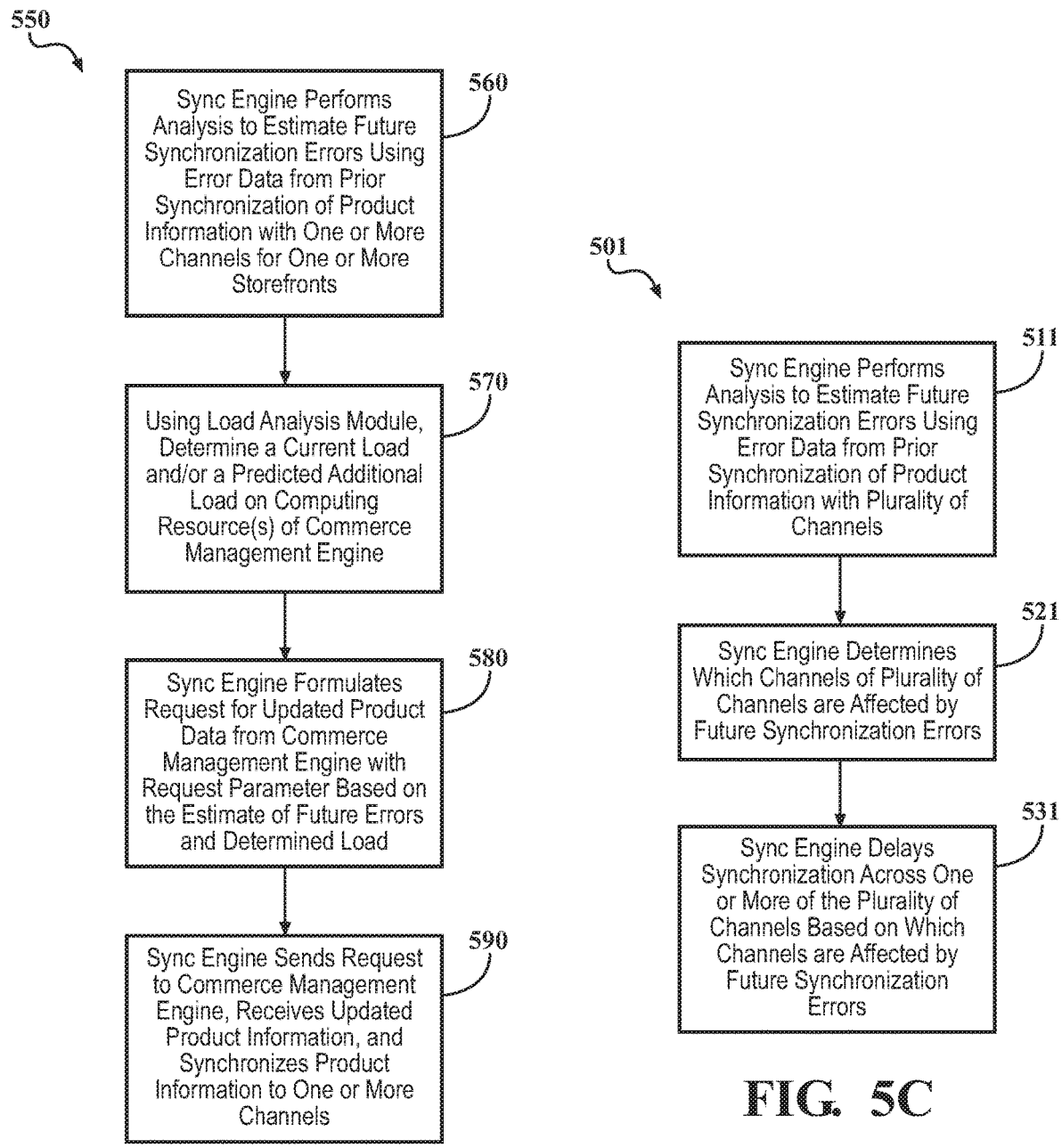
FIG. 5B depicts an exemplary process for using error data from a prior synchronization of product data to one or more channels and a determination of a load on computing resources of the commerce management engine to control a parameter of a request for product information from the e-commerce platform.
FIG. 5C depicts an exemplary process for using estimated future synchronization errors across channels to determine timing of future synchronizations for one or more channels.

With reference to FIG. 5B, an exemplary process 550 is shown which is similar in many respects to exemplary process 500, but wherein additional factors may be considered when formulating a request for product information for a future synchronization, such as a determined current load on one or more computing resources of the commerce management engine 136 or platform 100 and/or a determined predicted future load on the one or more computing resources of the commerce management engine 136 or platform 100 based on a request of a specific amount of data or computation. Process 550 thus uses error data from one or more prior synchronizations of product data to one or more channels as well as a determined load to control one or more parameters related to requesting updated product information from the commerce management engine 136 for a future product synchronization. In this manner, a load on the e-commerce platform 100 and/or commerce management engine 136 may be minimized, optimized, and/or kept within appropriate bounds.

At a step 560, the synchronization engine 300 performs an analysis of error data from a prior synchronization of product information with one or more channels 110, in a similar manner to that described elsewhere herein, possibly in association with the predictive analytics module 302. The error data may include identified errors from synchronization with channels and information regarding how errors are resolved and how long it took to resolve the errors.

At a step 570, a current load and/or a predicted future load on one or more computing resources may be determined, wherein the determined load can be used as a factor in formulating a request for additional product data to the commerce management engine 136. Determining a current load on computing resources of the platform may include analyzing performance measures or metrics for the computing resources associated with the platform 100 or commerce management engine 136. The computing resources may include network, processing, database, storage, and memory resources, and one or more of the computing resources may be finite. A variety of metrics may be used to check a network load, such as throughput, bandwidth, speed, CPU utilization, average response time, number of (API) requests, request fields or connections, or to otherwise determine performance measures associated with one or more computing resources. In embodiments, a load analysis module 308 (as shown in FIG. 3) of the synchronization engine 300 may determine a current load on the commerce management engine 136 or platform 100, although, in embodiments, the load analysis module 308 may be located elsewhere, such as on or external to the platform 100.

The commerce management engine 136 may be in communication with the synchronization engine 300 via a network and network performance metrics or measures, such as network load, bandwidth, and speed may be factored into a load determination. Network monitoring techniques may monitor network access, routers, slow or failing components, firewalls, switches, and server performance, as well as traffic and traffic patterns.

The commerce management engine 136 may include processing resources and database resources. The availability, response time, processing speed, latency, and throughput of these computing resources may be monitored. Database activity monitoring tools may monitor database events and can be accomplished by different techniques such as network sniffing reading databases audit logs or system tables, or memory scrapping.

A predicted future load may be a predicted future additional load based on a proposed request of a specified amount of product data and/or computation. The predicted future load may be based on historical data, and may be iteratively determined, as an optimized request is being formulated.

A current load and a predicted additional load may be combined in a determined load, which may comprise a composite load value that is within a specified range and takes into account various different performance metrics and/or computing resources. For example, a determined load may be a value between 1-100, with a higher value indicating a higher load on the platform 100 or commerce management engine 136.

At a step 580, the synchronization engine 300, formulates one or more requests to the commerce management engine 136 to report updated product information for one or more products, storefronts and/or channels, wherein a request parameter of each request to the commerce management engine 136 for product information is based on the estimate of synchronization errors and the determined load.

Parameters that may be included in a request may be as described elsewhere herein and may include a time period over which product information or product information changes are to be reported, a set of specified times for which the product information or product information changes are to be reported (which may be a periodic schedule), and/or a set of one or more specified products for which product information or product information changes is to be reported, such as on a product, storefront, or channel basis. Control of the parameters in a request for product information allows for errors to be minimized in a future product synchronization and an additional load on the e-commerce platform 100 to be controlled.

For example, requests to the commerce management engine 136 may be delayed if a determined load or a composite load value is above a predetermined level. Requests to the commerce management engine 136 may be limited in amount of data and/or computation requested if a determined load or a composite load value is above a predetermined level.

In embodiments, an estimated number of future synchronization errors may be determined, and a future synchronization for one or more products, storefronts, or channels, may be delayed if the estimated number of future errors is above a predetermined threshold and/or the composite load value is above a predetermined level.

For example, product information related to products 1-1000 may need to be updated, with an update scheduled for a time T1. A predetermined threshold for a number of future synchronization errors may be set at 50%. A predetermined level for a composite load value may be set at 95%. Assume that a number of future synchronization errors is determined to be 600 (affecting 600 products) with a composite load value of 75% (computed assuming that product information for all 1000 products is to be requested). In such a case, a request may specify that product data for the 600 products likely to have errors not be requested from the commerce management engine 136 until a delayed time T2. A request may specify that product data for the 400 products that are not anticipated to have errors be requested from the commerce management engine 136 at T1. Alternatively, a request may specify that product data for all 1000 products be requested from the commerce management engine at T2.

In another example, using the same predetermined threshold and predetermined level as above, assume that a number of future synchronization errors is determined to be 300 (affecting 300 products) with a composite load value of 96%. In this case, a request may specify that product data for the 700 products that are not anticipated to have errors be requested at a time when the composite load value falls below 95%. A request may specify that product data for the 300 products that are anticipated to have errors be requested at a time when both of the following have occurred: a composite load value falls below 95% and a determined time T3 has passed.

In another example, using the same predetermined threshold and predetermined level as above, assume that a number of future synchronization errors is determined to be 650 (affecting 800 products) with a composite load value of 96%. In this case, a request may specify that product data for the 200 products that are not anticipated to have errors be requested at a time when the composite load value falls below 95% and a request may specify that product data for the 800 products that are anticipated to have errors be requested at a time when both of the following have occurred: a composite load value falls below 95% and a determined time T4 has passed.

In another example, using the same predetermined threshold and predetermined level as above, assume that a number of future synchronization errors is determined to be 250 (affecting 250 products) with a composite load value of 80%. In this case, a request may specify that product data for all 1000 products occur at a time T1 or a request may specify that product data for 750 products that are not anticipated to have errors be requested at a time T1 and specify that product data for the 250 products that are anticipated to have errors be requested at a determined time T5 has passed.

In embodiments, a composite factor score may be determined, which may take into account a number of factors for whether it is desirable to request product information from the commerce management engine 136. The composite factor score may take into account a number and/or a type of future synchronization error, a composite load value, a criticality of the error, and the like. In embodiments, the composite factor score may be used to formulate a request for requesting product information from the commerce management engine 136, wherein if a composite factor score is above a predetermined threshold, a request is delayed and/or an amount of product information and/or computation requested is decreased until a time that the composite factor score indicates favorable conditions.

In embodiments, steps 560 and 570 may be simultaneously performed or either step may be performed before the other. In embodiments, steps 570 and 580 may be iteratively performed, wherein in an initial step 570, a specified amount of product information in a request is based on a prior or current request, and in subsequent passes, a specified amount of product information in a request is based on a prior formulated request, such that a predicted future load more closely tracks the formulated request.

At a step 590, the synchronization engine 300 may send the request to the commerce management engine 300, receive the product information requested, automatically correct some product data fields, and proceed with a synchronization of product information, for one or more storefronts or for one or more selected channels.

With reference to FIG. 5C, an exemplary process 501 is shown which is similar in some respects to exemplary process 500 in that future synchronization errors are estimated, but wherein a future synchronization is delayed, for one or more channels, based on whether a channel is affected by the future synchronization errors.

At a step 511, the synchronization engine 300 performs an analysis of error data from one or more prior synchronizations of product information with one or more channels 110, in a similar manner to that described elsewhere herein, possibly in association with the predictive analytics module 302. The error data may include identified errors from synchronization with channels and information regarding how errors are resolved and how long it took to resolve the errors.

At a step 521, the future synchronization errors are analyzed, such as by determining a number of future synchronization errors per channel, a number of a particular type of future synchronization errors per channel, or simply determining whether or not a channel is affected by any synchronization errors.

At a step 531, a future synchronization may be delayed, for one or more of the channels, based on whether or not a channel is affected by future synchronization errors, based on a number of affected channels exceeding a predetermined threshold, or the like.

In embodiments, the synchronization engine may subsequently proceed with a synchronization of product information, synchronizing product information to the plurality of channels, once the future synchronization errors are resolved. In embodiments, the product information may be synchronized to a particular channel once future synchronization errors with respect to that channel are resolved to a predetermined extent or the channel is not affected to a predetermined extent. In embodiments, the product information may be synchronized to the plurality of channels if the future synchronization errors are resolved such that the number of channels affected is below a predetermined threshold.

Figure 6:
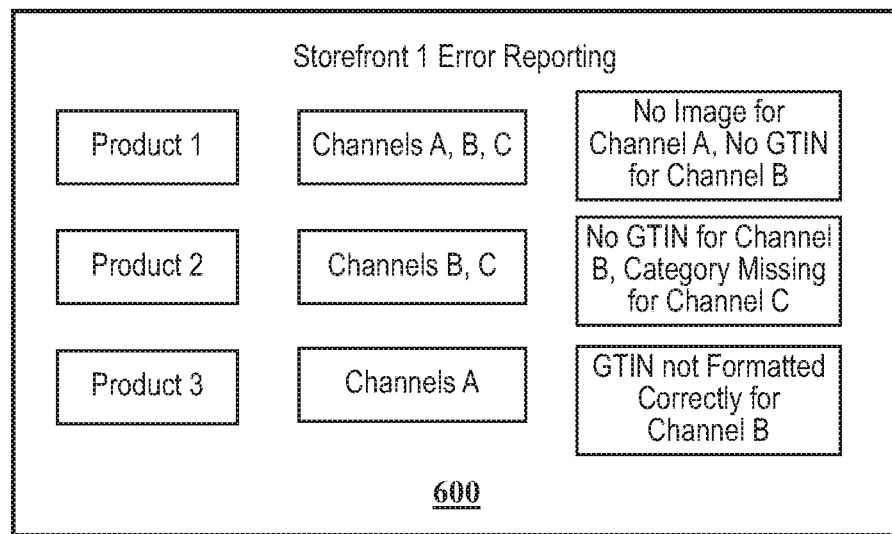
FIG. 6 depicts an exemplary user interface for displaying identified errors to a merchant.
Figure 7:
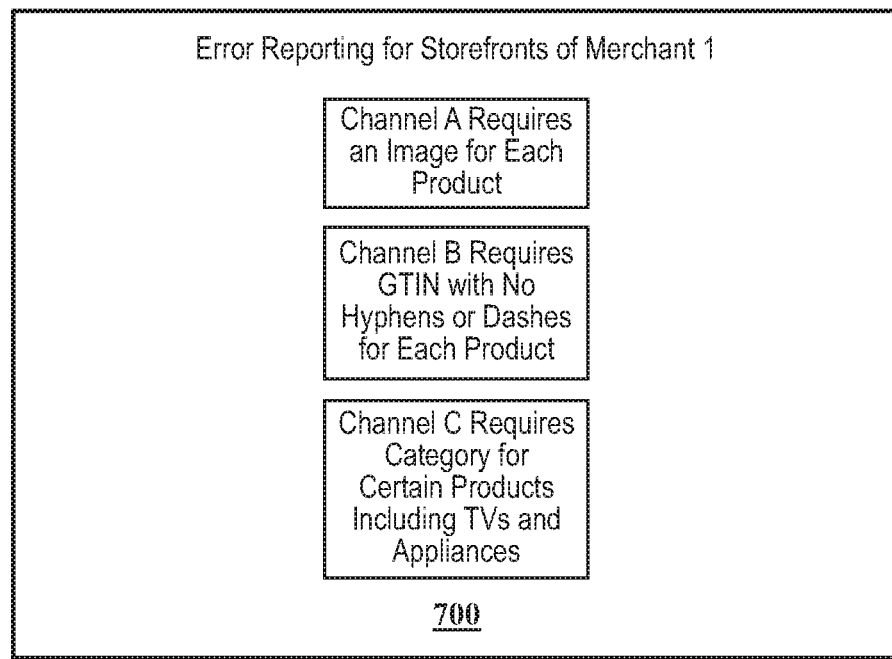
FIG. 7 depicts an exemplary user interface for displaying consolidated errors for channels.

Referring to FIGS. 6 and 7, exemplary user interfaces 600 and 700 may be provided for a merchant user for reporting purposes and for the merchant user to view and respond to error data for selected channels of an associated storefront. Product errors may be provided per product as shown in FIG. 6. In embodiments, such as shown in FIG. 7, the user interface may consolidate errors across channels. A user interface may also consolidate errors across products, storefronts, channels 110, and/or other divisions. Additionally, a summary of errors may be provided in other formats, with errors grouped by type. For example, all GTIN error data or all UPC errors may be grouped together.

Figure 8:
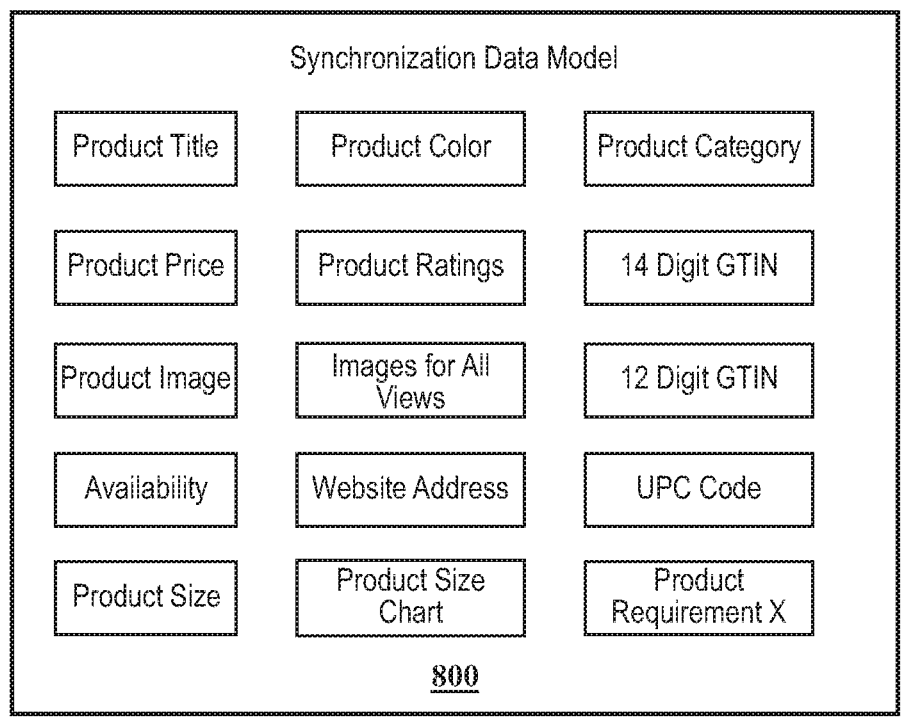
FIGS. 8 and 9 depict exemplary user interfaces utilizing a synchronization data model to depict which product data fields are required for a particular channel.
Figure 9:
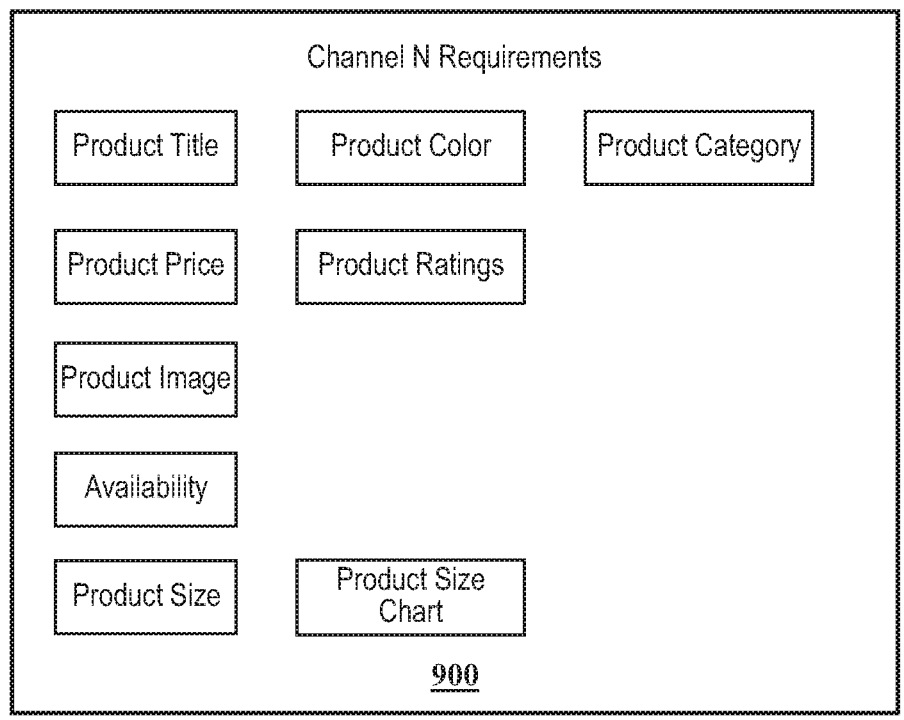

In embodiments, a user interface may allow a merchant user to select one or more channels for marketing products and the merchant user may be presented with, for each selected channel, a respective product page template with the required product data fields shown or highlighted with the remaining product fields greyed out or removed. The product page template (and the particular fields that are highlighted/active vs. not required/greyed out) may be based on a synchronization data model and error data, which may be updated in real time as errors are determined across channels and the relevant product fields and formats for each channel are updated. For example, FIGS. 8 and 9 depict an exemplary user interface 800. In particular, the user interface may use a synchronization data model that keeps track of product data fields and formats that are required for each channel. For example, all the possible product data fields for channels 110 supported by the synchronization data engine may be displayed, such as in FIG. 8. Once a specific channel 110 (or set of channels 110) is selected for product synchronization, the user interface may present those product data fields that are required for the selected channel(s), such as shown in FIG. 9. In this manner, a storefront (e.g., a merchant) is provided with only product data fields that are required for each particular selected channel or set of channels.

Additionally, pop-ups on a user interface may alert a merchant user to product information fields that need to be filled in or corrected, such as according to each selected channel. Functionality may be provided to correct existing product errors together, such as by applying an added element of product information to a product information data field for multiple channels.

In embodiments, a product page template can be also be based on the synchronization data model, which may be updated in real-time as errors are determined across channels and the relevant product fields and formats for each channel are updated.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer system comprising:
    a processor; and
    a computer-readable medium storing a set of instructions that, when executed, cause the computer system to:
        estimate, using error data, at least one future synchronization error of product information to one or more channels, wherein each channel has one or more respective product data fields for that channel and wherein the error data relates to a prior synchronization of product information from one or more storefronts to the one or more channels and includes at least one of an identified error from the prior synchronization and a corresponding correction for resolving the identified error;
        determine a request parameter based on the at least one estimated future synchronization error and one or more additional factors, the one or more additional factors including one or more of a criticality of the errors, a current load on a computing resource of a commerce management engine, and a predicted additional load on the commerce management engine based on a request for a specified amount of product information; and
        send a request to the commerce management engine associated with the one or more storefronts, requesting product information for one or more products of the one or more storefronts for a future product synchronization with the one or more channels, the request including the request parameter.

2. The system of claim 1, wherein the request parameter is a timing parameter that is based on a predicted time of resolution of the at least one estimated future synchronization error.

3. The system of claim 1, wherein the request parameter is a timing parameter that includes a specified time period for reporting product information changes for the one or more products of the one or more storefronts which occur in the specified time period.

4. The system of claim 1, wherein the request parameter is a timing parameter that includes one or more specified times for reporting product information changes relative to a prior reporting time for the one or more products of the one or more storefronts.

5. The system of claim 1, wherein the request parameter includes at least one product field of the one or more storefronts.

6. The system of claim 1, wherein the set of instructions, when executed, further cause the computer system to: determine if the one or more channels have any new product data fields required for synchronization.

7. The system of claim 6, wherein the set of instructions, when executed, further cause the computer system to: generate a suggestion to provide relevant product data for a new required product data field.

8. The system of claim 1, wherein the set of instructions, when executed, further cause the computer system to: analyze error data across a group of storefronts or a group of products for a particular channel.

9. The system of claim 1, wherein the error data is analyzed on a per channel basis, to determine a number of estimated future errors per channel, and wherein the future product synchronization is delayed for a specific channel responsive to the number of future errors for the channel being greater than a respective predetermined threshold.

10. The system of claim 1, wherein the set of instructions, when executed, further cause the computer system to acquire the error data wherein acquiring the error data includes:
- receiving, for one or more storefronts, product information for products and selected channels for the products,
- translating, for the one or more storefronts, relevant product information to a translated product format for each respective selected channel, and
- synchronizing each translated product format with the respective selected channel.

11. A computer-implemented method comprising:
- estimating, by a processor using error data, at least one future synchronization error of product information to one or more channels, wherein each channel has respective product data fields for that channel, and wherein the error data relates to a prior synchronization of product information from one or more storefronts to the one or more channels and includes at least one of an identified error from the prior synchronization and a corresponding correction for resolving the identified error;
- determining, by the processor, a load on a computing resource of a commerce management engine associated with the one or more storefronts, wherein the determined load encompasses at least one of a current load and a predicted future load on the computing resource of the commerce management engine; and
- formulating, by the processor, a request to the commerce management engine for product information for one or more products of the one or more storefronts for a future synchronization with the one or more channels, wherein the request includes a request parameter that is based on the estimated at least one future synchronization error and the determined load.

12. The method of claim 11, wherein the computing resource includes at least one of a network resource, a processing resource, a database resource, a storage resource, and a memory resource.

13. The method of claim 11, wherein the determined load comprises a composite load value.

14. The method of claim 13, wherein a request is delayed responsive to the composite load value being above a predetermined level.

15. The method of claim 14, wherein the predetermined level varies based on a number of future synchronization errors.

16. The method of claim 13, wherein the determining and formulating steps are performed in an iterative manner.

17. The method of claim 16, wherein an amount of product information requested by the request is decreased responsive to the composite load value being above a predetermined level.

18. The method of claim 11, wherein the predicted future load on the computing resource of the commerce management engine is due to at least one of a request for a specified amount of product information or a request for a specified computation.

19. A computer-implemented method comprising:
- estimating, by a processor using error data, at least one future synchronization error of product information to a plurality of channels, wherein each channel has respective product data fields for that channel and wherein the error data relates to a prior synchronization of product information from one or more storefronts to the plurality of channels and includes at least one of an identified error from the prior synchronization and a corresponding correction for resolving the identified error;
- determining a request parameter based on the at least one estimated future synchronization error and one or more additional factors, the one or more additional factors including one or more of a criticality of the errors, a current load on a computing resource of a commerce management engine, or a predicted additional load on the commerce management engine based on a request for a specified amount of product information;
- determining whether each channel of the plurality of channels is affected by the at least one future synchronization error to a predetermined extent; and
- delaying a future synchronization of product information to the plurality of channels responsive to a number of channels affected to the predetermined extent being above a predetermined threshold.

20. The method of claim 19, wherein each future synchronization error is categorized based on a type of error.

21. The method of claim 19, wherein each future synchronization error is determined on a per channel basis and a future synchronization of product information to a specific channel is delayed responsive to if the specific channel being affected to the predetermined extent.

22. The method of claim 19, wherein the predetermined extent relates to a number or a type of future synchronization errors.

23. The method of claim 19, wherein the future synchronization is delayed for all the channels of the plurality of channels.

24. The system of claim 7, wherein the generated suggestion is automatically implemented.

* * * * *